R. H. WAPPLER.
ELECTRIC MACHINE FOR THERAPEUTIC PURPOSES.
APPLICATION FILED OCT. 11, 1910.

992,302.

Patented May 16, 1911.

4 SHEETS—SHEET 1.

R. H. WAPPLER.
ELECTRIC MACHINE FOR THERAPEUTIC PURPOSES.
APPLICATION FILED OCT. 11, 1910.

992,302.

Patented May 16, 1911.

4 SHEETS—SHEET 2.

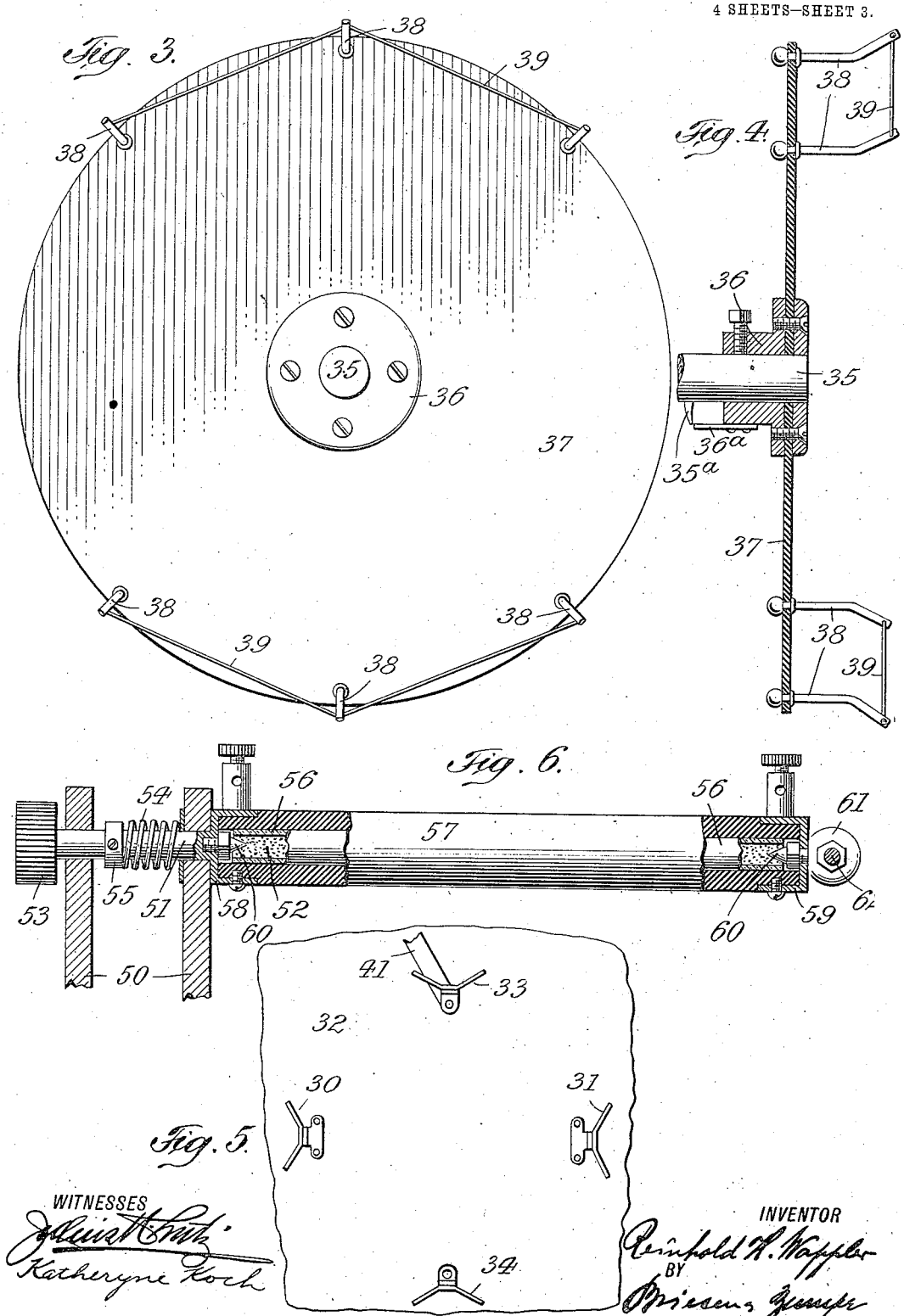

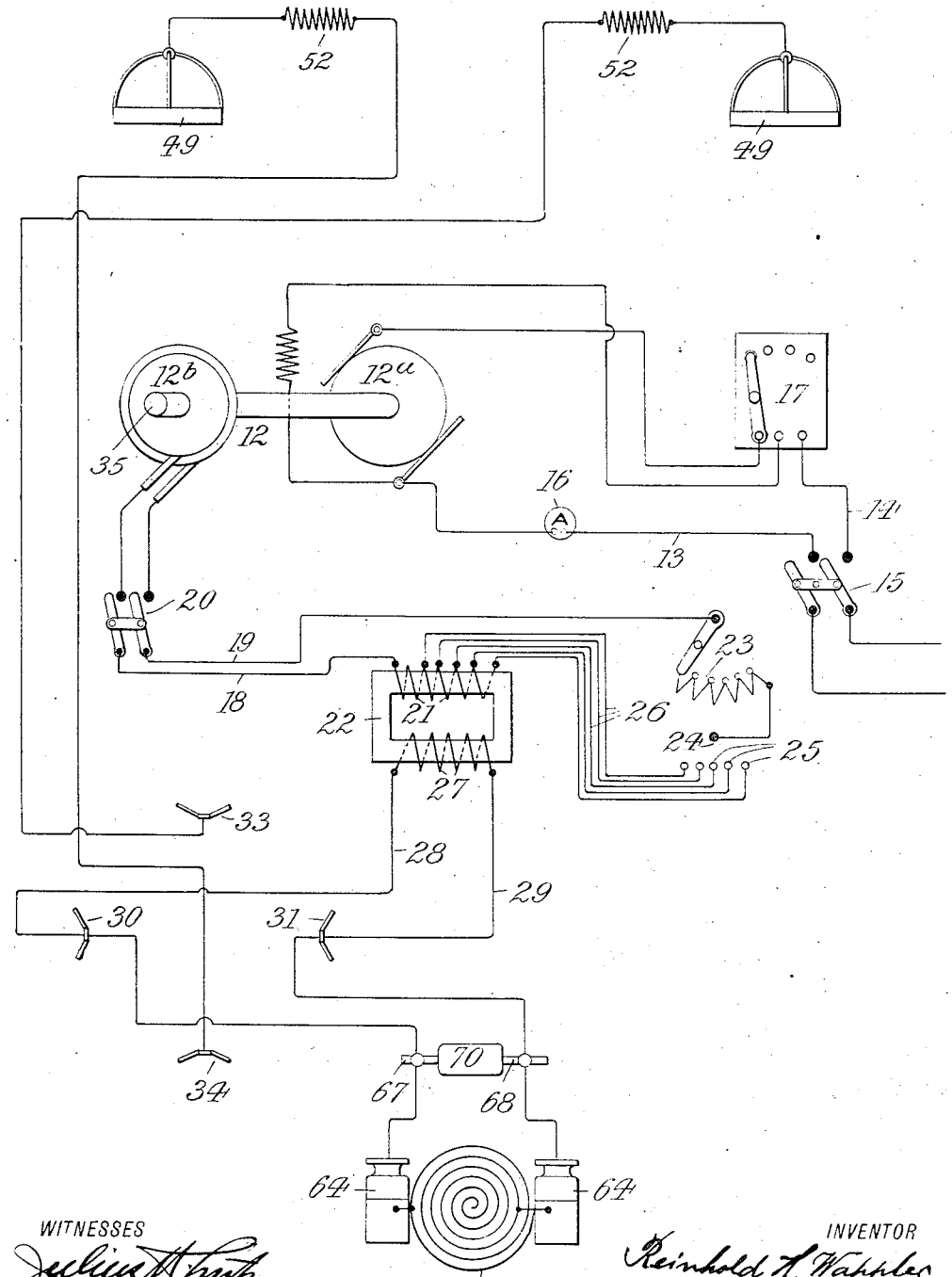

UNITED STATES PATENT OFFICE.

REINHOLD H. WAPPLER, OF NEW YORK, N. Y., ASSIGNOR TO WAPPLER ELECTRIC MANUFACTURING COMPANY, OF NEW YORK, N. Y., A CORPORATION.

ELECTRIC MACHINE FOR THERAPEUTIC PURPOSES.

992,302.   Specification of Letters Patent.   Patented May 16, 1911.

Application filed October 11, 1910. Serial No. 586,445.

*To all whom it may concern:*

Be it known that I, REINHOLD H. WAPPLER, a citizen of the United States, residing at New York city, county and State of New York, have invented a new and Improved Electric Machine for Therapeutic Purposes, of which the following is a specification.

This invention relates to a novel machine for producing unidirectional as well as oscillatory electric current for therapeutic purposes, in a simple and reliable manner.

Briefly stated the machine comprises a suitably driven electric generator for producing an alternating current of medium frequency and comparatively low voltage, which current is passed through the primary coils of a step-up transformer. The secondary coils of the latter are connected to a rectifier or pole changer, the movable member of which is rotated in synchronism with the rotor of the above generator, said rectifier producing the desired pulsating unidirectional current. The rectifier is so constructed that practically all of the oscillatory current is transformed into unidirectional current so that the formation of sparks between the metallic parts of the machine at undesirable points is prevented, thereby avoiding damage to the insulating parts of the rectifier. Instead of transposing the oscillatory current of medium frequency as obtained from the generator into unidirectional current, said oscillatory current may also be directly used for therapeutic purposes, or it may be changed into high-frequency oscillatory current as the case may require. The machine is further provided with suitable means for altering the current strength in the primary transformer coils, while additional means permit the selection of any number of primary coils to correspondingly vary the potential of the secondary current. The machine is further provided with efficient and readily operable means for discharging static energy, so as to subject the patient to the desired static breeze, or similar treatment.

Further novel features of construction are more fully brought out in the following specification and claims.

Figure 1:
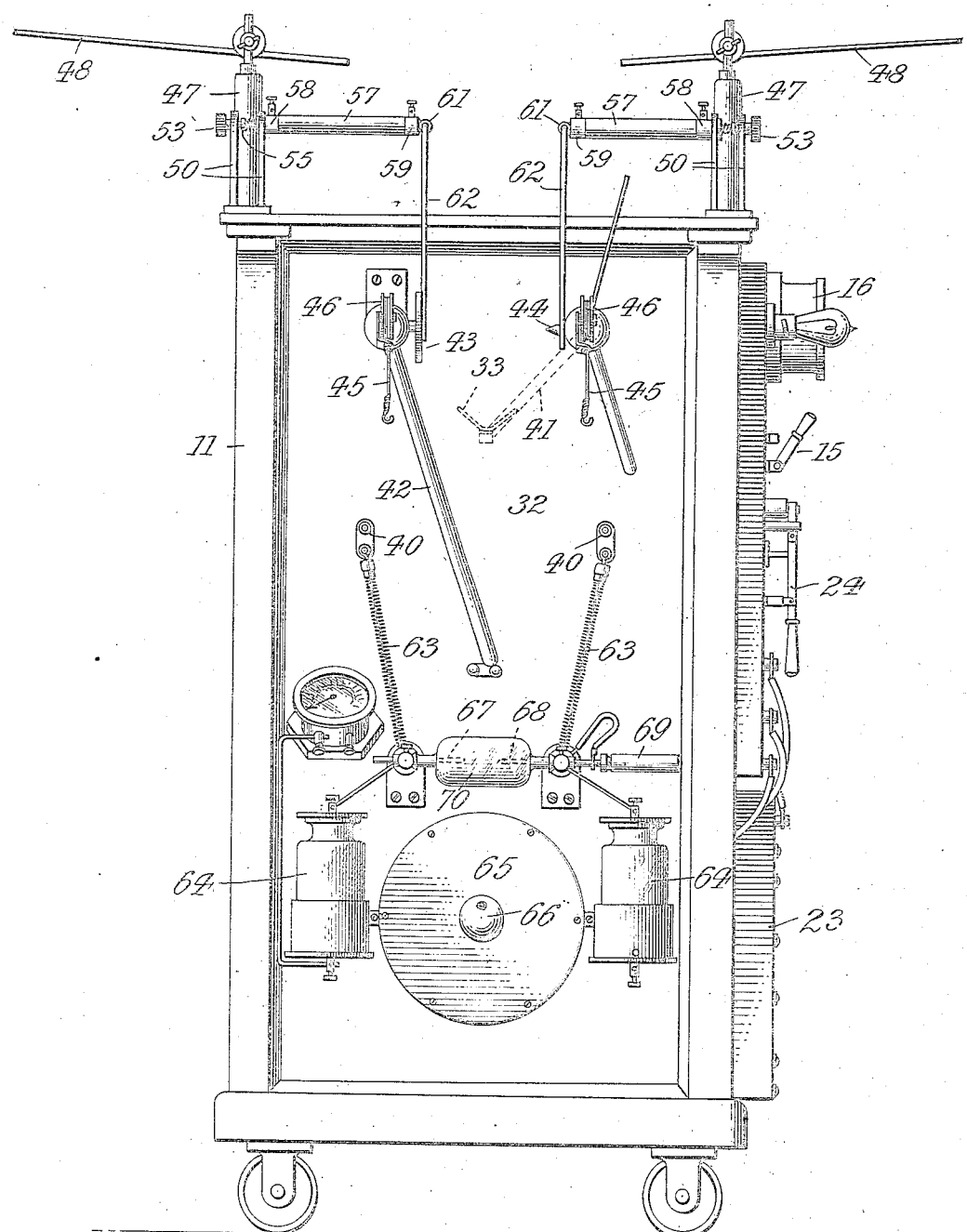
Figure 2:
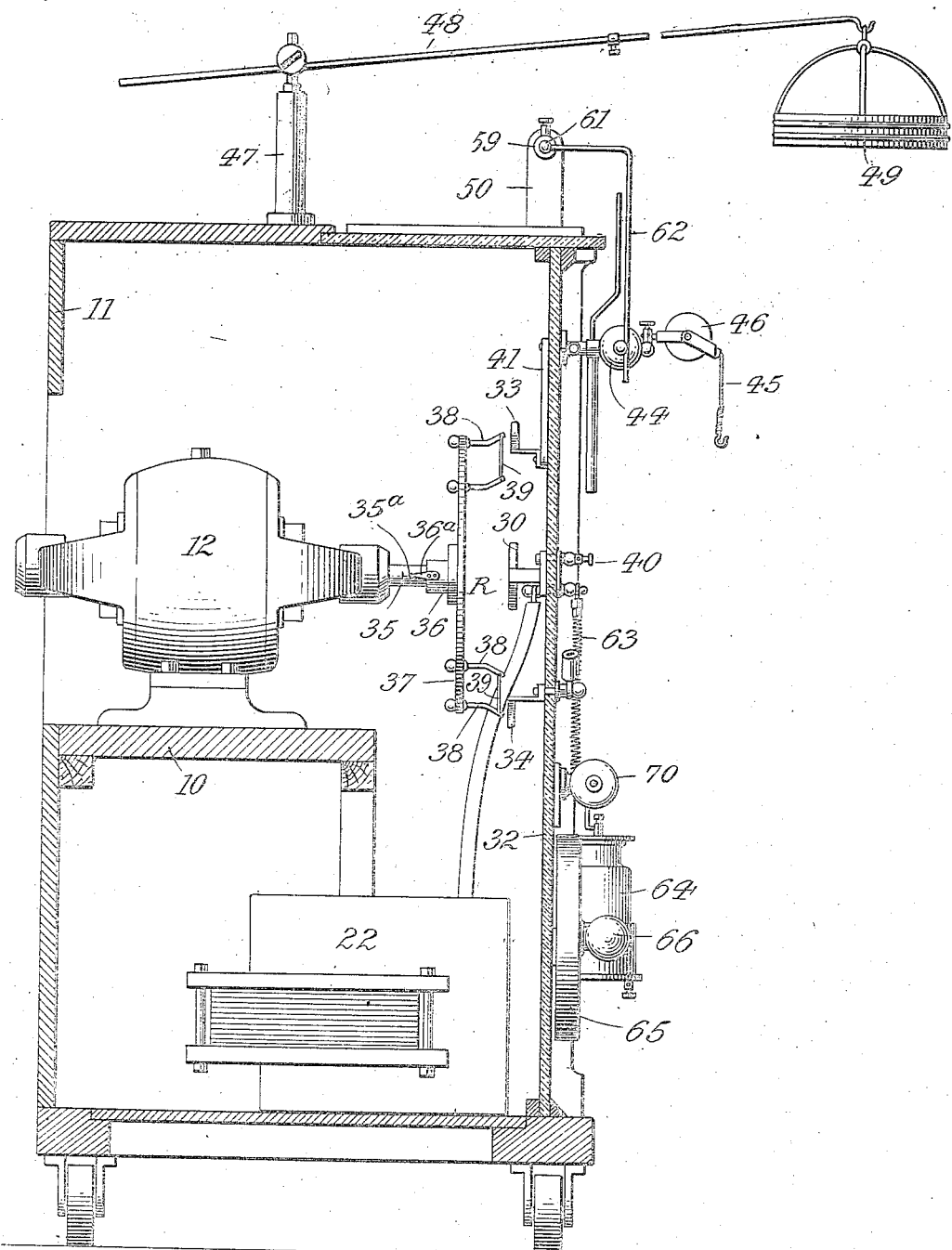

In the accompanying drawing: Figure 1 is a front view of my improved electric machine; Fig. 2 a vertical section therethrough; Fig. 3 a face view of the rotor of the rectifier; Fig. 4 a cross section therethrough; Fig. 5 a face view of the stationary conductors of the rectifier; Fig. 6 a longitudinal section through one of the resistances for the unidirectional current, and Fig. 7 a wiring diagram.

Upon a suitable frame 10 inclosed within a casing 11, is mounted an inverted converter 12, said converter comprising a direct current driving section $12^a$ and an alternating current generating section $12^b$. The necessary direct current is furnished to converter 12 through live wires 13, 14, which are provided with a bipolar switch 15, the current passing preferably through an ammeter 16 and a starting box 17. The generated alternating current is taken off through wires 18, 19 provided with a bipolar switch 20. Wire 18 leads to one terminal of the primary winding 21 of a step-up transformer 22, while wire 19 is connected to an adjustable resistance 23 which is in turn connected to a selector 24, the contacts 25 of which are connected, by wires 26, to separate primary coils, thus permitting an adjustment of the number of the primary coils for regulating the potential of the secondary transformer coil 27. The latter is, by wires 28, 29 connected to a pair of stationary current receiving conductors 30, 31 forming part of a rectifier R and mounted on the inner side of the insulating front plate 32 of casing 11, which plate is preferably made of glass. Conductors 30, 31 alternate with a pair of current delivery conductors 33, 34 which are also secured to plate 32. Conductors 30, 33, 31, 34 are arranged in a circle around the prolongated axis of converter-shaft 35. To the free end of the latter is secured, by a suitable clamping device 36, a disk or rotor 37 of insulating material. Rotor 37 is perforated near its periphery for the reception of two diametrically opposed sets of posts 38 arranged in substantial concentricity to conductors 30, 33, 31, 34. The free ends of the posts of each set are connected by a wire or metallic segment 39, the relative dimensions being such that the segments when rotated will pass closely by the conductors without coming in contact therewith. I prefer to construct each of the conductors in the form of an outwardly opening V, while the arc formed between the outer posts 38 of each set is of about 90° as illustrated in Figs. 5 and 3.

In order to readily ascertain the proper position of rotor 37 on shaft 35, and thus insure the necessary coincidence between the electric waves of the secondary current and the position of segments 37, shaft 35 is provided with an index 35ᵃ adapted to register with a pointer 36ᵃ of holder 36.

As thus far described, it will be seen that by closing switch 15 and properly manipulating the lever of starter 17, the converter is started to generate alternating current, which after closing switch 20, will flow through the primary transformer coil 21. The strength of current and the number of windings of the primary coil may be regulated through resistance 23 and selector 24. The secondary current thus induced in coil 27 will flow through wires 28, 29 to receiving conductors 30, 31. Owing to the rotation of segments 39 in front of the conductors synchronous with the oscillations of the secondary current and owing to the high potential of the latter, said current will jump the air gaps between segments and conductors and the positive and negative impulses delivered to conductors 30, 31 will be alternately transferred to conductors 33, 34, thereby transforming the alternating current into pulsating unidirectional current. By the peculiar construction of the rectifier, i. e. owing to the substantial length of posts 38, the electric sparks will not reach disk 37 so that the life of the latter is considerably prolonged. In order to still further increase the distance between segments 39 and disk 37, posts 38 may be bent slightly outward as illustrated in Figs. 2, 3 and 4.

Receiving conductors 30, 31 are conductively connected to binding posts 40 secured to the outer side of front plate 32. From these posts, the produced alternating current of medium frequency may be lead off for the desired therapeutic use. Delivery conductors 33, 34 are by insulated bars 41, 42 connected to electrodes 43, 44 from which static energy may be taken off through suitable wires connected to cables 45 wound upon pulleys 46 and conductively connected to electrodes 43, 44.

To the top of casing 11 are secured one or more standards 47, two of such standards being shown in the drawings. Within each standard is adjustably mounted a metallic rod or arm 48, the forward hook-shaped end of which supports a current delivery device such as a crown 49 adapted to be hung over the patient's body for producing the desired static breeze. Each standard 47 is conductively connected to a forked bearing 50 that supports the metallic stem 51 of a resistance 52. Stem 51 carries a knob 53, while a spring 54 interposed between a collar 55 of stem 51 and one of the shanks of bearing 50, prevents an accidental rotation of resistance 52. The latter consists preferably of asbestos embedded within an inner tube of insulating material 56, the asbestos possessing sufficient conductivity for the high-tensioned unidirectional current to produce the desired result. Tube 56 is received within the central bore of an outer insulating tube 57, that is fitted into metallic sockets 58, 59, socket 58 forming part of stem 51. Pointed screws 60 tapped into sockets 58, 59 and entering asbestos 52 effect the necessary contact between sockets 58, 59 and the asbestos. Each socket 59 is integral with a perforated knob 61 into which is fitted a bent rod 62, the free end of which is adapted to engage one of the electrodes 43, 44. It will be seen that by properly turning knobs 53, crowns 49 may either be connected to or disconnected from electrodes 43, 44, one of which is positive while the other is negative.

For producing oscillating current of high frequency which is necessary for some therapeutic treatments, binding posts 40 on terminals 30, 31 may by detachable springs 63 be connected to the interior of a pair of Leyden jars 64, the outer coatings of which are connected to the spirals of an inductance coil 65 which is in turn connected to ball 66. The desired current may either be taken off from the outer coatings of jars 64 or from ball 66. Springs 63 are further connected to the rods 67, 68 between which a regulable spark gap is formed for which purpose rod 68 is provided with a handle 69 that permits a ready adjustment of said rod. The spark gap is preferably inclosed in a muffler 70 of colored glass.

It will be seen that by my invention, various kinds of electric current for therapeutic treatment may be produced in a simple and effective manner. Owing to the peculiar construction of the rectifier which latter utilizes the entire energy of the converter, undesirable sparks between metallic parts of the machine are prevented, while any damage to the rotor carrying the rectifying segments is avoided, so that repairs are minimized and the life of the machine is prolonged.

I claim:

1. In a machine of the character described, a converter, an insulating rotor secured to the converter-shaft, a pair of diametrically opposed receiving conductors, a step-up transformer having a primary coil in circuit with the converter-armature and a secondary coil in circuit with the receiving conductors, a pair of diametrically opposed delivery conductors intermediate the receiving conductors and insulated therefrom, two diametrically opposed sets of outwardly bent posts carried by the rotor, and wires connecting the posts of each set and adapted to be rotated in front of the conductors.

2. In a machine of the character described, a converter, a step-up transformer having a primary coil in circuit with the converter, a pair of V-shaped receiving conductors in circuit with the secondary coil of said transformer, a pair of intervening V-shaped delivery conductors, a disk of insulating material secured to the converter-shaft, two diametrically opposed sets of posts carried by said disk, and conductive segments connecting the posts of each set at a distance from the disk and adapted to be rotated in front of the conductors.

3. In a machine of the character described, a converter, a step-up transformer having a primary coil in circuit with the converter, a pair of V-shaped receiving conductors in circuit with the secondary coil of said transformer, a pair of intervening V-shaped delivery conductors, a disk of insulating material secured to the converter-shaft, two diametrically opposed sets of posts carried by said disk, conductive segments connecting the posts of each set at a distance from the disk and adapted to be rotated in front of the conductors, and current delivery means in circuit with the delivery conductors.

4. In a machine of the character described, a converter, a step-up transformer having a primary coil in circuit with the converter, a pair of V-shaped receiving conductors in circuit with the secondary coil of said transformer, a pair of intervening V-shaped delivery conductors, a disk of insulating material secured to the converter shaft, two diametrically opposed sets of posts carried by said disk, conductive segments connecting the posts of each set at a distance from the disk and adapted to be rotated in front of the conductors, electrodes conductively connected to the delivery conductors, and current delivery means adapted to be connected to said electrodes.

5. In a machine of the character described, a current rectifier comprising a rotor of insulating material, diametrically opposed sets of posts carried by said rotor, a conductive segment secured to the posts of each set at a distance from the rotor, and conductors coöperating with said segments.

6. In a machine of the character described, a current rectifier comprising a rotor of insulating material, diametrically opposed sets of posts carried by said rotor, a conductive segment secured to the posts of each set at a distance from the rotor, and V-shaped conductors coöperating with said segments.

7. In a machine of the character described, a current rectifier comprising a rotor of insulating material, diametrically opposed sets of outwardly bent posts carried by said rotor, a conductive wire secured to the posts of each set at a distance from the rotor, and V-shaped conductors coöperating with said wires.

8. In a machine of the character described, an inverted converter, an index on the converter-shaft, a rotor of insulating material clamped to said shaft and having a pointer which is adapted to register with said index, diametrically opposed sets of posts carried by the rotor, a conductive segment secured to the posts of each set at a distance from the rotor, and V-shaped conductors coöperating with said segments.

9. In a machine of the character described, a converter, an insulating rotor secured to the converter-shaft, a pair of diametrically opposed receiving conductors, a step-up transformer having a primary coil in circuit with the converter-armature and a secondary coil in circuit with the receiving conductors, a pair of diametrically opposed delivery conductors intermediate the receiving conductors and insulated therefrom, two diametrically opposed sets of posts carried by the rotor, conductive segments connecting the posts of each set and adapted to be rotated in front of the conductors, and current delivery means in circuit with the delivery conductors.

REINHOLD H. WAPPLER

Witnesses:
 FRANK V. BRIESEN,
 ARTHUR E. ZUMPE.